United States Patent
Liu et al.

(10) Patent No.: US 12,277,367 B1
(45) Date of Patent: Apr. 15, 2025

(54) USER SCENARIO-BASED AUDIO PLAYBACK METHOD, APPARATUS AND DEVICE, AND STORAGE MEDIUM

(71) Applicant: Linkplay Technology Inc., Newark, CA (US)

(72) Inventors: Ning Liu, Newark, CA (US); Lifeng Zhao, Newark, CA (US); Qi Wang, Newark, CA (US)

(73) Assignee: Linkplay Technology Inc., Newark, CA (US)

( * ) Notice: Subject to any disclaimer, the term of this patent is extended or adjusted under 35 U.S.C. 154(b) by 0 days.

(21) Appl. No.: 18/934,776

(22) Filed: Nov. 1, 2024

(30) Foreign Application Priority Data

Jul. 24, 2024 (CN) .......................... 202410992945.X

(51) Int. Cl.
  *G06F 3/16* (2006.01)
  *G01J 1/42* (2006.01)
  *G01P 15/08* (2006.01)

(52) U.S. Cl.
  CPC ............ *G06F 3/165* (2013.01); *G01J 1/4204* (2013.01); *G01P 15/08* (2013.01)

(58) Field of Classification Search
  CPC .......... G06F 3/165; G01J 1/4204; G01P 15/08
  See application file for complete search history.

(56) References Cited

U.S. PATENT DOCUMENTS

| | | | |
|---|---|---|---|
| 2020/0186114 A1* | 6/2020 | Xu | H03G 3/3005 |
| 2022/0076692 A1* | 3/2022 | Deng | G06F 3/165 |
| 2022/0225035 A1* | 7/2022 | Guo | H04R 25/43 |
| 2023/0104111 A1* | 4/2023 | Murgai | H04S 7/304 |
| | | | 381/303 |

FOREIGN PATENT DOCUMENTS

| | | | |
|---|---|---|---|
| CN | 107871000 A | | 4/2018 |
| CN | 113038281 A | | 6/2021 |

(Continued)

OTHER PUBLICATIONS

First Office Action issued in counterpart Chinese Patent Application No. 202410992945.X, dated Aug. 31, 2024.

(Continued)

*Primary Examiner* — Joseph Saunders, Jr.
(74) *Attorney, Agent, or Firm* — Westbridge IP LLC

(57) ABSTRACT

A user scenario-based audio playback method includes: obtaining a target user scenario that a user is currently in and user historical data; determining a plurality of pieces of candidate preset information corresponding to the target user scenario from a preset device configuration information table; calculating, based on the user historical data, a degree of scenario relevance, the quantity of playbacks and the quantity of selected times of a corresponding preset state of each candidate preset information; calculating a recommendation coefficient of each candidate preset information based on the degree of scenario relevance, the quantity of playbacks and the quantity of selected times; determining target preset information from the plurality of pieces of candidate preset information according to the recommendation coefficient; and adjusting a playback parameter of an audio device based on the target preset information and playing an audio.

14 Claims, 4 Drawing Sheets

(56) References Cited

FOREIGN PATENT DOCUMENTS

| CN | 113099294 A | 7/2021 |
|---|---|---|
| CN | 113377323 A | 9/2021 |
| CN | 115878070 A | 3/2023 |
| CN | 117271812 A | 12/2023 |

OTHER PUBLICATIONS

Notification to Grant Patent Right for Invention issued in counterpart Chinese Patent Application No. 202410992945.X, dated Sep. 6, 2024.
Wang et al., Recommendation of Android Application Services via User Scenarios, Computer Science, vol. 49, No. 6A, pp. 267-271 and 344, dated Jun. 9, 2022.

* cited by examiner

USER SCENARIO-BASED AUDIO PLAYBACK METHOD, APPARATUS AND DEVICE, AND STORAGE MEDIUM

CROSS-REFERENCE TO RELATED APPLICATIONS

The present application claims priority to Chinese Patent Application No. 202410992945.X, filed on Jul. 24, 2024, which is incorporated herein by reference in its entirety.

TECHNICAL FIELD

The present application relates to the field of audio processing technologies, and in particular, to a user scenario-based audio playback method, apparatus and device, and a storage medium.

BACKGROUND

Generally, in a conventional audio playback control method, an audio to be played and audio preset information are obtained, and the audio to be played is played based on the audio preset information. This approach does not take into account user preferences in different environments, leading to a low match between the audio preset information and the user's preferred audio parameters in the current environment, frequently requiring the user to readjust the audio parameters, and reducing the adaptability and convenience of audio playback.

SUMMARY

The present application provides a user scenario-based audio playback method, apparatus and device, and a storage medium.

In a first aspect, the present application provides a user scenario-based audio playback method, including:
  obtaining a target user scenario that a user is currently in and user historical data;
  determining a plurality of pieces of candidate preset information corresponding to the target user scenario from a preset device configuration information table, where the device configuration information table includes a plurality of preset states, each preset state includes preset information of a plurality of different user scenarios;
  calculating, based on the user historical data, a degree of scenario relevance, the quantity of playbacks and the quantity of selected times of a corresponding preset state of each candidate preset information;
  calculating a recommendation coefficient of each candidate preset information based on the degree of scenario relevance, the quantity of playbacks and the quantity of selected times;
  determining target preset information from the plurality of pieces of candidate preset information according to the recommendation coefficient; and adjusting a playback parameter of an audio device based on the target preset information and playing an audio.

In a possible implementation, obtaining the target user scenario that the user is currently in and user historical data includes:
  obtaining relevant data of an environment where the user is currently in through a preset sensor;
  analyzing the relevant data based on a preset model to obtain the target user scenario; and retrieving audio usage information of the user from a local storage of the audio device to obtain the user historical data.

In a possible implementation, obtaining relevant data of the environment where the user is currently in through the preset sensor includes:
  obtaining brightness data of ambient light at a location where the user is currently in through a light sensor;
  obtaining acceleration data of the audio device at a current time through an accelerometer;
  obtaining geographical location information of the user at the current time through a locator; and
  obtaining a sound wave signal at the location where the user is currently in through an audio detector.

In a possible implementation, analyzing the relevant data based on the preset model to obtain the target user scenario includes:
  performing feature extraction on the relevant data through a convolutional neural network to obtain feature information; and
  inputting the feature information into a scenario classification model and predicting the target user scenario based on a classification rule of the scenario classification model.

In a possible implementation, calculating based on the user historical data the degree of scenario relevance, the quantity of playbacks and the quantity of selected times of the corresponding preset state of each candidate preset information includes:
  determining the quantity of playbacks of each candidate preset information from the user historical data;
  determining the quantity of selected times of the preset state corresponding to each candidate preset information based on the user historical data, and calculating a total quantity of playbacks of all preset information within each preset state; and
  calculating the degree of scenario relevance of each candidate preset information based on the quantity of playbacks of each candidate preset information and the corresponding total quantity of playbacks.

In a possible implementation, calculating the recommendation coefficient of each candidate preset information based on the weighted sum of the degree of scenario relevance, the quantity of playbacks and the quantity of selected times includes:
  configuring corresponding weights to the degree of scenario relevance, the quantity of playbacks and the quantity of selected times;
  calculating a first coefficient, a second coefficient and a third coefficient based on the quantity of selected times, the degree of scenario relevance and the quantity of playbacks with the respective weights; and
  calculating the recommendation coefficient of each candidate preset information based on the first coefficient, the second coefficient and the third coefficient.

In a possible implementation, in a case where the quantity of selected times corresponds to a first weight, the degree of scenario relevance corresponds to a second weight, and the quantity of playbacks corresponds to a third weight, calculating the first coefficient, the second coefficient and the third coefficient based on the quantity of selected times, the degree of scenario relevance and the quantity of playbacks with the respective weights includes:
  normalizing the quantity of playbacks to obtain a play coefficient;
  multiplying the first weight by the quantity of selected times to obtain the first coefficient;

multiplying the second weight by the degree of scenario relevance to obtain the second coefficient; and multiplying the third weight by the play coefficient to obtain the third coefficient.

In a possible implementation, determining the target preset information from the plurality of pieces of candidate preset information according to the recommendation coefficient further includes:

arranging all recommendation coefficients, and selecting a first one of the recommendation coefficients as an initial recommendation coefficient;

selecting a current recommendation coefficient in an order of arrangement, and comparing the current recommendation coefficient with the initial recommendation coefficient; in response to that the current recommendation coefficient is greater than the initial recommendation coefficient, updating the initial recommendation coefficient until all recommendation coefficients are traversed, to obtain a target recommendation coefficient; where the target recommendation coefficient is a final updated initial recommendation coefficient; and determining the target preset information from the plurality of pieces of candidate preset information based on the target recommendation coefficient.

In a possible implementation, the user scenario-based audio playback method further includes:

subsequent to adjusting the playback parameter of the audio device based on the target preset information and playing the audio, synchronizing the target preset information to a device to be synchronized through a communication protocol.

In a possible implementation, synchronizing the target preset information to the device to be synchronized through the communication protocol includes:

receiving an update command, and creating a synchronization message based on the update command and the target preset information; where the synchronization message includes the target preset information and identification information; and posting the synchronization message to a predetermined message queue, to enable the device to be synchronized to synchronize the synchronization message.

In a possible implementation, the audio device includes a smart button, and the method further includes:

subsequent to adjusting the playback parameter of the audio device based on the target preset information and playing the audio, receiving a target command of the user to trigger the smart button; and executing a corresponding preset function based on the target command, where the preset function includes: one-button audio playback, one-button switching of audio input sources, one-button switching of audio playback modes, one-button adjustment of audio playback sound effects, and one-button bookmarking of audio content.

In a possible implementation, executing the corresponding preset function based on the target command includes:

analyzing the target command and extracting key information;

creating a hash key based on the key information; and searching for the corresponding preset function in a predetermined hash index based on the hash key, and executing the preset function.

In a second aspect, the present application provides a user scenario-based audio playback apparatus, including:

an obtaining module, configured to obtain a target user scenario that a user is currently in and user historical data;

a selecting module, configured to determine a plurality of pieces of candidate preset information corresponding to the target user scenario from a preset device configuration information table, where the device configuration information table includes a plurality of preset states, each preset state includes preset information of a plurality of different user scenarios; a count module, configured to calculate, based on the user historical data, a degree of scenario relevance, the quantity of playbacks and the quantity of selected times of a corresponding preset state of each candidate preset information;

a calculating module, configured to calculate a recommendation coefficient of each candidate preset information based on the degree of scenario relevance, the quantity of playbacks and the quantity of selected times;

a determining module, configured to determine target preset information from the plurality of pieces of candidate preset information according to the recommendation coefficient; and a processing module, configured to adjust a playback parameter of an audio device based on the target preset information and play an audio.

In a possible implementation, the obtaining module includes:

an obtaining unit, configured to obtain relevant data of an environment where the user is currently in through a preset sensor;

an analyzing unit, configured to analyze the relevant data based on a preset model to obtain the target user scenario; and a retrieving unit, configured to retrieve audio usage information of the user from a local storage of the audio device to obtain the user historical data.

In a possible implementation, the obtaining unit is specifically configured to:

obtain brightness data of ambient light at a location where the user is currently in through a light sensor;

obtain acceleration data of the audio device at a current time through an accelerometer;

obtain geographical location information of the user at the current time through a locator; and obtain a sound wave signal at the location where the user is currently in through an audio detector.

In a possible implementation, the analyzing unit is specifically configured to:

perform feature extraction on the relevant data through a convolutional neural network to obtain feature information; and input the feature information into a scenario classification model and predict the target user scenario based on a classification rule of the scenario classification model.

In a possible implementation, the count module is specifically configured to:

determine the quantity of playbacks of each candidate preset information from the user historical data;

determine the quantity of selected times of the preset state corresponding to each candidate preset information based on the user historical data, and calculate a total quantity of playbacks of all preset information within each preset state; and calculate the degree of scenario relevance of each candidate preset information based on the quantity of playbacks of each candidate preset information and the corresponding total quantity of playbacks.

In a possible implementation, the calculating module includes:

a configuring unit, configured to configure corresponding weights to the degree of scenario relevance, the quantity of playbacks and the quantity of selected times;

a first calculating unit, configured to calculate a first coefficient, a second coefficient and a third coefficient based on the quantity of selected times, the degree of scenario relevance and the quantity of playbacks with the respective weights; and a second calculating unit, configured to calculate the recommendation coefficient of each candidate preset information based on the first coefficient, the second coefficient and the third coefficient.

In a possible implementation, the first calculating unit is specifically configured to:

normalize the quantity of playbacks to obtain a play coefficient;

multiply the first weight by the quantity of selected times to obtain the first coefficient;

multiply the second weight by the degree of scenario relevance to obtain the second coefficient; and multiply the third weight by the play coefficient to obtain the third coefficient.

In a possible implementation, the determining module is specifically configured to: arrange all recommendation coefficients, and select a first one of the recommendation coefficients as an initial recommendation coefficient;

select a current recommendation coefficient in an order of arrangement, and compare the current recommendation coefficient with the initial recommendation coefficient; in response to that the current recommendation coefficient is greater than the initial recommendation coefficient, update the initial recommendation coefficient until all recommendation coefficients are traversed, to obtain a target recommendation coefficient; where the target recommendation coefficient is a final updated initial recommendation coefficient; and determine the target preset information from the plurality of pieces of candidate preset information based on the target recommendation coefficient.

In a possible implementation, the user scenario-based audio playback apparatus further includes: a synchronizing module, configured to synchronize the target preset information to a device to be synchronized through a communication protocol.

In a possible implementation, the synchronizing module is specifically configured to:

receive an update command, and create a synchronization message based on the update command and the target preset information; where the synchronization message includes the target preset information and identification information; and post the synchronization message to a predetermined message queue, to enable the device to be synchronized to synchronize the synchronization message.

In a possible implementation, the user scenario-based audio playback apparatus further includes:

a receiving module, configured to receive a target command of the user to trigger the smart button; and an executing module, configured to execute a corresponding preset function based on the target command, where the preset function includes: one-button audio playback, one-button switching of audio input sources, one-button switching of audio playback modes, one-button adjustment of audio playback sound effects, and one-button bookmarking of audio content.

In a possible implementation, the executing module is specifically configured to:

analyze the target command and extract key information;
create a hash key based on the key information; and
search for the corresponding preset function in a predetermined hash index based on the hash key, and execute the preset function.

In a third aspect, the present application provides a user scenario-based audio playback device, including: a memory and at least one processor, where the memory has stored thereon instructions, and the at least one processor calls the instructions in the memory to cause the user scenario-based audio playback device to implement the above-mentioned user scenario-based audio playback method.

In a fourth aspect, the present application provides a computer-readable storage medium having stored thereon instructions, where the instructions, when executed on a computer, cause the computer to implement the above-mentioned user scenario-based audio playback method.

DETAILED DESCRIPTION OF THE EMBODIMENTS

The embodiments of the present application provide a user scenario-based audio playback method, apparatus and device, and a storage medium, so as to improve the adaptiveness and convenience of audio playback through matching a user scenario with corresponding preset information and adjusting a playback parameter for audio playback.

Terms such as "first", "second", "third" and "fourth" (if present) in the description, claims and drawings of the present disclosure are used to differentiate similar objects, and not necessarily used to describe a specific sequence or order. It should be appreciated that the data used in this way may be interchanged under an appropriate circumstance, so that the embodiment of the present disclosure described herein, for example, may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device.

As can be appreciated, an entity for executing the present application may be the user scenario-based audio playback apparatus, or it may also be a terminal or a server, which is not particularly defined herein. In the embodiments of the present application, a case where the entity is a server is used as an example for illustration.

Figure 1:
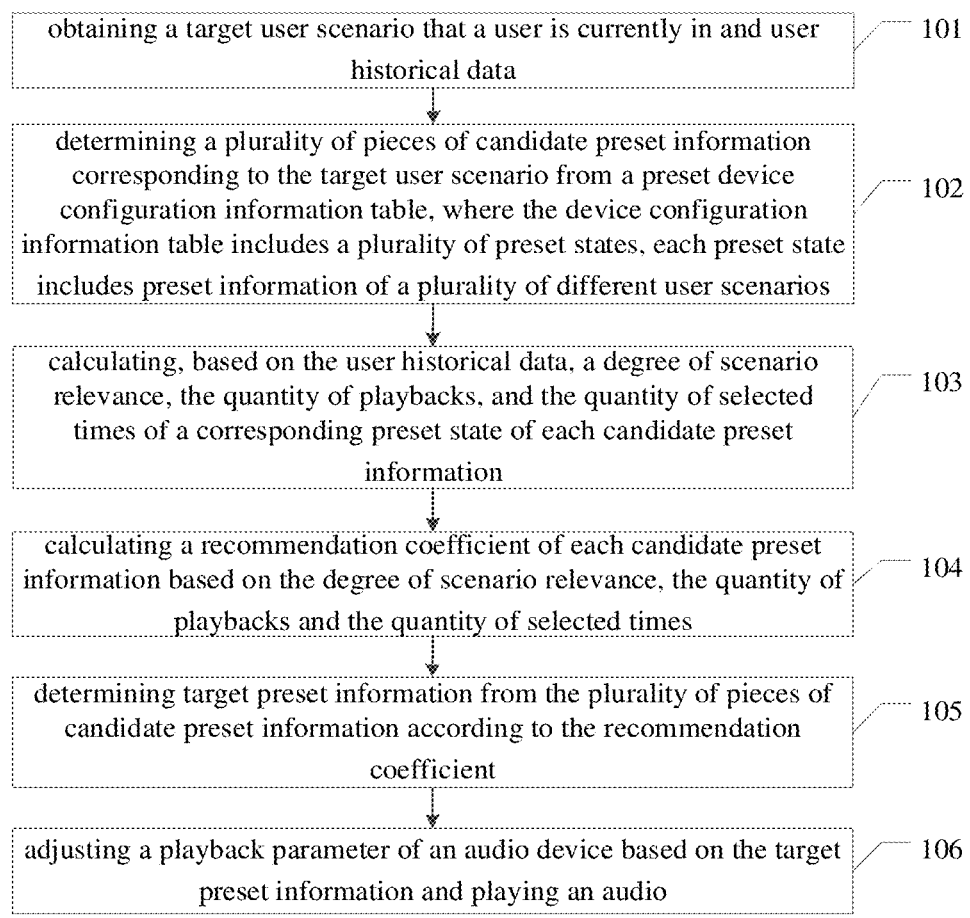
FIG. 1 is a schematic diagram of an embodiment of a user scenario-based audio playback method according to the embodiments of the present application.

To facilitate understanding, the specific process of the embodiments of the present application will be described below. Please refer to FIG. 1, an embodiment of a user scenario-based audio playback method according to the embodiments of the present application includes the following steps.

Step 101, obtaining a target user scenario that a user is currently in and user historical data.

When the user turns on the audio device, a trigger instruction is generated. The server receives the trigger instruction, and retrieves a plurality of pre-set user scenarios based on the trigger instruction, which are displayed on an interface of the audio device. The user selects the target user scenario and clicks, and click information is generated. The server receives and parses the click information, thereby determining the target user scenario.

The user may also input the corresponding user scenario or scenario description via voice. After the server receives the user's voice input, it performs recognition on the voice and matches it to the corresponding target user scenario.

The server receives the voice information inputted by the user, converts the voice information into text, and performs feature extraction on the text based on a preset model to obtain feature information. The feature information is inputted into a scenario classification model, and matched to the corresponding target user scenario based on a classification rule of the scenario classification model.

When performing feature extraction on the text, a pretrained word meaning recognition model is used to identify a polysemous word in the text, so as to obtain polysemous word information. Context information of the polysemous word is extracted. A target word corresponding to the polysemous word is determined based on the polysemous word information and the context information, so as to obtain target word information. Feature fusion is performed based on the target word information and other textual features than the polysemous word, so as to obtain feature information.

The user historical data refers to usage records of the audio device saved within the audio device.

Step 102, determining a plurality of pieces of candidate preset information corresponding to the target user scenario from a preset device configuration information table, where the device configuration information table includes a plurality of preset states, each preset state includes preset information of a plurality of different user scenarios.

The preset states include a home state, an outdoor state, a work state, etc. The user scenarios include a rest scenario, an exercise scenario, a chatting scenario, a noisy scenario, etc. Each preset state includes all the user scenarios. The preset information includes a plurality of parameters of the audio setting, such as volume, sound effect, playback duration, etc. Each scenario corresponds to one piece of preset information The target user scenario is matched with user scenarios in the preset device configuration information table, preset information of a plurality of matched user scenarios is extracted, so as to obtain the plurality of pieces of candidate preset information.

For example, when the target user scenario is an exercise scenario, a query is performed among the plurality of preset states in the preset device configuration table. The preset information corresponding to the exercise scenario from each preset state is extracted, so as to obtain the plurality of pieces of candidate preset information.

Step 103, calculating, based on the user historical data, a degree of scenario relevance, the quantity of playbacks, and the quantity of selected times of a corresponding preset state of each candidate preset information.

The degree of scenario relevance of each candidate preset information may be pre-set by the user. For example, in a case where the candidate preset information includes first candidate preset information, second candidate preset information, third candidate preset information and fourth candidate preset information, the user sets a first degree of scenario relevance for the first candidate preset information, a second degree of scenario relevance for the second candidate preset information, a third degree of scenario relevance for the third candidate preset information, and a fourth degree of scenario relevance for the fourth candidate preset information.

In a case where a preset scenario within the preset state is selected for playback, the playback parameter of the audio device is adjusted based on the preset information corresponding to the preset scenario and the audio is played, and an increment of 1 in the quantity of selected times of the preset state is recorded. The quantity of playbacks for the preset information is determined by the quantity of times the audio is played. For example, 10 audio tracks are played after selecting the preset information, an increment of 10 in the quantity of playbacks for that preset information is recorded.

Therefore, the degree of scenario relevance, the quantity of playbacks, and the quantity of selected times of the corresponding preset state for each candidate preset information may be searched from the user historical data.

Step 104, calculating a recommendation coefficient of each candidate preset information based on the degree of scenario relevance, the quantity of playbacks and the quantity of selected times.

Weights corresponding to the degree of scenario relevance, the quantity of playbacks and the quantity of selected times may be pre-set, e.g., a first weight is assigned to the quantity of selected times, a second weight is assigned to the degree of scenario relevance, and a third weight is assigned to the quantity of playbacks.

The quantity of selected times is multiplied by the first weight to obtain a first recommendation score, the degree of scenario is multiplied by the second weight to obtain a second recommendation score, and the quantity of playbacks is multiplied by the third weight to obtain a third recommendation score. The corresponding first, second, and third recommendation scores are added together to obtain the recommendation coefficient for each candidate preset information.

Step 105, determining target preset information from the plurality of pieces of candidate preset information according to the recommendation coefficient.

Recommendation coefficients are grouped and compared with each other in each group to obtain the maximum recommendation coefficient in each group. Maximum recommendation coefficients in groups are compared with each other to obtain a target maximum recommendation coefficient. The target preset information corresponding to the target maximum recommendation coefficient is determined from the plurality of pieces of candidate preset information.

For example, recommendation coefficients include 0.1, 0.34, 0.8, 0.53, 0.49, 0.62, 0.5 and 0.73, the recommendation coefficients are divided into two groups. A first group includes: 0.1, 0.34, 0.8 and 0.53. A second group includes:

0.49, 0.62, 0.5 and 0.73. The recommendation coefficients in the first group are compared with each other, yielding 0.8>0.53>0.34>0.1. The recommendation coefficients in the second group are compared with each other, yielding 0.73>0.62>0.5>0.49. Thus, it is determined that the maximum recommendation coefficient in the first group is 0.8, and the maximum recommendation coefficient in the second group is 0.73. 0.8 is compared with 0.73, yielding 0.8>0.73, thereby determining that 0.8 is the target maximum recommendation coefficient.

Step 106, adjusting a playback parameter of an audio device based on the target preset information and playing an audio.

For example, the target preset information includes: volume at 50%, sound effect as pop, playback mode as shuffle, and playback duration of 1 hour. Current playback parameters are: volume at 30%, sound effect as classical, playback mode as repeat one, and playback duration of 1 hour. After adjusting the playback parameters of the audio device based on the target preset information, the playback parameters are: volume at 50%, sound effect as pop, playback mode as shuffle, and playback duration of 1 hour. An audio is selected from the audio device for playback and played based on the playback parameters.

In the embodiments of the present application, the target user scenario where the user is currently in and the user historical data are obtained, a plurality of pieces of candidate preset information corresponding to the target user scenario is determined from a pre-set device configuration information table. The device configuration information table includes a plurality of preset states, each preset state includes preset information of different user scenarios. Based on the user historical data, a degree of scenario relevance, the quantity of playbacks, and the quantity of selected times of a corresponding preset state of each candidate preset information are calculated. A recommendation coefficient of each candidate preset information is calculated based on the degree of scenario relevance, the quantity of playbacks and the quantity of selected times. The target preset information is determined from the plurality of pieces of candidate preset information according to the recommendation coefficient. The playback parameter of the audio device is adjusted based on the target preset information, and the audio is played. Therefore, it is able to improve the adaptiveness and convenience of audio playback.

Figure 2:
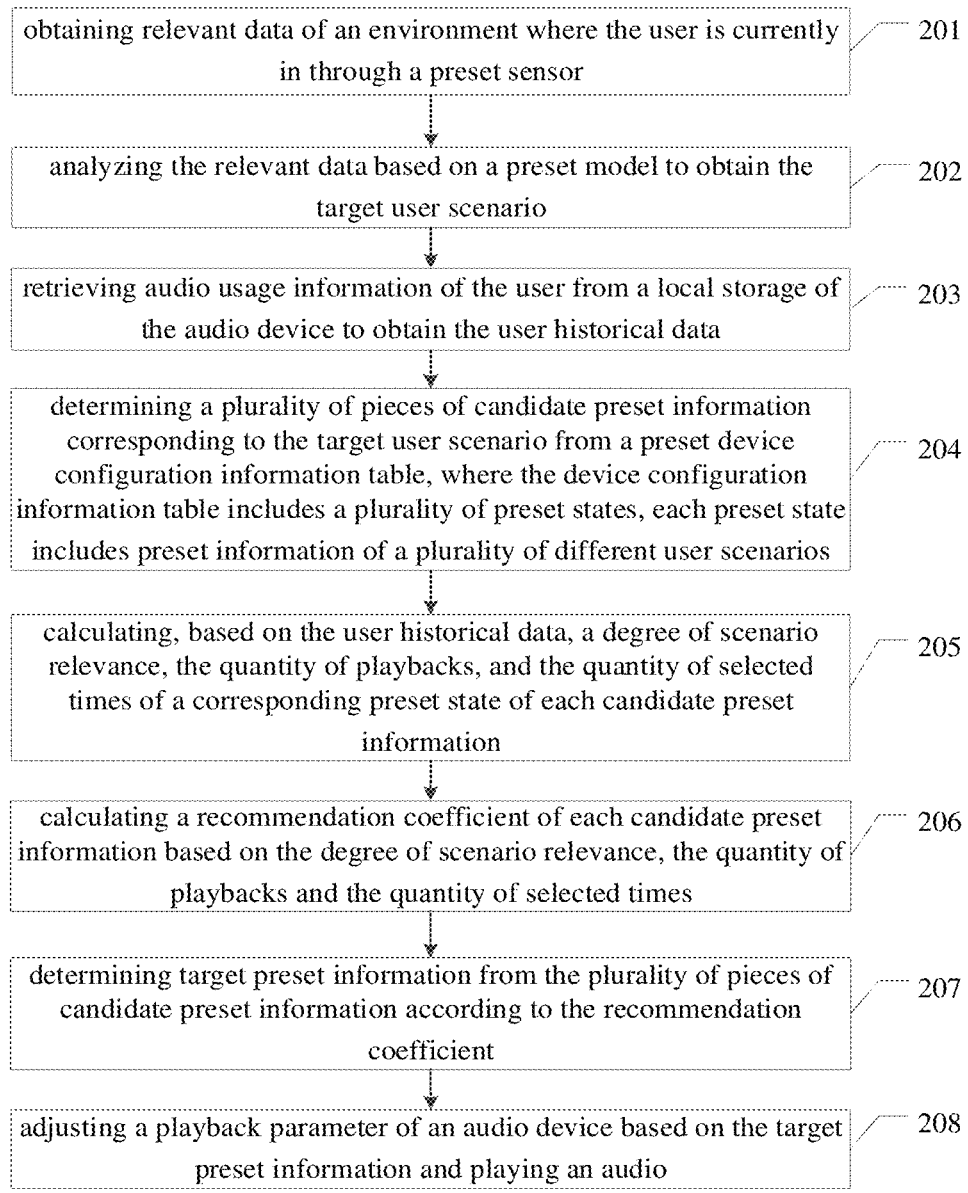
FIG. 2 is a schematic diagram of another embodiment of the user scenario-based audio playback method according to the embodiments of the present application.

Please refer to FIG. 2, another embodiment of the user scenario-based audio playback method according to the embodiments of the present application includes the following steps.

Step 201, obtaining relevant data of an environment where the user is currently in through a preset sensor.

Brightness data of ambient light at a location where the user is currently in is obtained through a light sensor. Acceleration data of the audio device at a current time is obtained through an accelerometer. Geographical location information of the user at the current time is obtained through a locator. A sound wave signal at the location where the user is currently in is obtained through an audio detector.

Step 202, analyzing the relevant data based on a preset model to obtain the target user scenario.

Feature extraction is performed on the relevant data through a convolutional neural network to obtain feature information, the feature information is inputted into a scenario classification model and the target user scenario is predicted based on a classification rule of the scenario classification model.

Feature extraction is performed on the brightness data, the acceleration data, the geographic location information and the sound wave signals separately to obtain feature information. When feature extraction is performed on the brightness data, an average value, a maximum value, a minimum value, a standard deviation or a rate of change of light brightness values over a preset time period may be calculated. For example, the preset time period may be 10 seconds, and light brightness value is recorded every second, so as to obtain 10 brightness values. Calculations are performed based on the 10 brightness values to obtain features corresponding to the brightness data. The average value thereof shows an average light level of the environment, the maximum and minimum values thereof reveal a range of brightness values fluctuation, and the standard deviation or rate of change thereof indicates the speed and stability of brightness values change. When feature extraction is performed on the acceleration data, an average value, a standard deviation, a maximum value and a minimum value of acceleration values over a preset time period may be calculated. The average value of the acceleration values shows an overall level of the acceleration values, the standard deviation of the acceleration values reveals a range of the acceleration values fluctuation, and the maximum and minimum values thereof indicate a range of the acceleration values change. Time-domain information of the acceleration data are extracted, and time-domain features include zero-crossing rate, root mean square (RMS) value, and slope change rate. The zero-crossing rate reflects the speed of change of an acceleration curve, the root mean square value reflects the vibration degree of the acceleration values, and the slope change rate reflects the change trend and vibration mode of the acceleration curve. The acceleration data is transformed from the time domain to a frequency domain through Fourier transform to obtain spectrum information. The spectrum information reflects the frequency distribution of the acceleration values. When feature extraction is performed on the geographic location information, latitude and longitude coordinates may be extracted. Based on the latitude and longitude coordinates, the user's location is determined, as well as a distance from this location to a specific location, and the population density of a region corresponding to the user's location. The location may be a residential region, an office region, a park, or a commercial district. The specific location may be a mall or a scenery spot. When feature extraction is performed on the sound wave signal, the amplitude, frequency, duration, etc. of the sound may be extracted. The sound wave signal is converted into a spectrogram through a Fourier transform algorithm. Based on the spectrogram, the frequency distribution and timbre characteristics of the sound are analyzed. A decibel value is determined from the sound wave signal to determine the intensity or loudness of the sound. The sound wave signal may also be used to detect whether the audio contains human voices or such specific sounds as applause, coughing or a doorbell.

Step 203, retrieving audio usage information of the user from a local storage of the audio device to obtain the user historical data.

Step 204, determining a plurality of pieces of candidate preset information corresponding to the target user scenario from a preset device configuration information table, where the device configuration information table includes a plurality of preset states, each preset state includes preset information of a plurality of different user scenarios.

The execution process of step 204 is similar to that of step 102, which will not be elaborated on herein.

Step 205, calculating, based on the user historical data, a degree of scenario relevance, the quantity of playbacks, and the quantity of selected times of a corresponding preset state of each candidate preset information.

The quantity of playbacks of each candidate preset information is determined from the user historical data, the quantity of selected times of the preset state corresponding to each candidate preset information is determined based on the user historical data, and a total quantity of playbacks of all preset information within each preset state is calculated. The degree of scenario relevance of each candidate preset information is calculated based on a ratio of the quantity of playbacks of each candidate preset information to the corresponding total quantity of playbacks.

For example, the preset state includes first preset information, second preset information, third preset information and fourth preset information, where a first quantity of playbacks of the first preset information is 1000, a second quantity of playbacks of the second preset information is 500, a third quantity of playbacks of the third preset information is 200, and a fourth quantity of playbacks of the fourth playback information is 300. A total quantity of playbacks of all preset information included in the preset state=the first quantity of playbacks+the second quantity of playbacks+the third playback number+the fourth playback number=1000+500+200+300=2000. A first degree of scenario relevance of the first preset information=the first quantity of playbacks/the total quantity of playbacks=1000/2000=0.5, a second degree of scenario relevance of the second preset information=the second quantity of playbacks/the total quantity of playbacks=500/2000=0.25, a third degree of scenario relevance of the third preset information=the third quantity of playbacks/the total quantity of playbacks=200/2000=0.1, and a fourth degree of scenario relevance of the fourth preset information=the fourth quantity of playbacks/the total quantity of playbacks=300/2000=0.15.

Step 206, calculating a recommendation coefficient of each candidate preset information based on the degree of scenario relevance, the quantity of playbacks and the quantity of selected times.

Corresponding weights are configured to the degree of scenario relevance, the quantity of playbacks and the quantity of selected times. A first coefficient, a second coefficient and a third coefficient are calculated based on the degree of scenario relevance, the quantity of playbacks and the quantity of selected times with the respective weights. The recommendation coefficient of each candidate preset information is calculated based on the first coefficient, the second coefficient and the third coefficient.

A first weight is assigned to the quantity of selected times, a second weight is assigned to the degree of scenario relevance, and a third weight is assigned to the quantity of playbacks. The quantity of playbacks is normalized to obtain a play coefficient. The first weight is multiplied by the quantity of selected times to obtain the first coefficient, the second weight is multiplied by the degree of scenario relevance to obtain the second coefficient, the playback coefficient is multiplied by the third weight to obtain the third coefficient, the corresponding first coefficient, second coefficient and third coefficient are added together to obtain the recommendation coefficient of each candidate preset information.

For example, the first weight is 0.6, the second weight is 0.3, and the third weight is 0.1. The candidate preset information includes fifth candidate preset information, sixth candidate preset information and seventh candidate preset information. The fifth candidate preset information corresponds to a first preset state, the sixth candidate preset information corresponds to a second preset state, and the seventh candidate preset information corresponds to a third preset state. A fifth degree of scenario relevance of the fifth candidate preset information is 0.8, a fifth quantity of playbacks is 1000, and a first quantity of selected times of the first preset state is 5. A sixth degree of scenario relevance of the sixth candidate preset information is 0.4, a sixth quantity of playbacks is 500, and a second quantity of selected times of the second preset state is 2. A seventh degree of scenario relevance of the seventh candidate preset information is 0.6, a seventh quantity of playbacks is 200, and a third quantity of selected times of the third preset state is 1. Next, the fifth quantity of playbacks, the sixth quantity of playbacks and the seventh quantity of playbacks are added together to obtain a target quantity of playbacks, where the target quantity of playbacks=1000+500+200=1700. Based on the fifth quantity of playbacks and the target quantity of playbacks, a first playback coefficient is calculated, where the first playback coefficient=the fifth quantity of playbacks/the target quantity of playbacks=1000/1700=0.6. Based on the sixth quantity of playbacks and the target quantity of playbacks, a second playback coefficient is calculated, where the second playback coefficient=the sixth quantity of playbacks/the target quantity of playbacks=500/1700=0.3. Based on the seventh quantity of playbacks and the target quantity of playbacks, a third playback coefficient is calculated, where the third playback coefficient=the seventh quantity of playbacks/the target quantity of playbacks=200/1700=0.1. The first quantity of selected times, the second quantity of selected times, and the third quantity of selected times are calculated with the first weight respectively, so as to obtain first coefficients of multiple pieces of candidate preset information. The first coefficient of the fifth candidate preset information=the first quantity of selected times * the first weight=5*0.6=3, the first coefficient of the sixth candidate preset information=the second quantity of selected times * the first weight=2*0.6=1, and the first coefficient of the seventh candidate preset information=the third quantity of selected times * the first weight=1*0.6=0.6. The fifth degree of scenario relevance, the sixth degree of scenario relevance and the seventh degree of scenario relevance are calculated with the second weight respectively, so as to obtain second coefficients of multiple pieces of candidate preset information. The second coefficient of the fifth candidate preset information=the fifth degree of scenario relevance * the second weight=0.8*0.3=0.24, the second coefficient of the sixth candidate preset information=the sixth degree of scenario relevance * the second weight=0.4*0.3=0.12, and the second coefficient of the seventh candidate preset information=the seventh degree of scenario relevance * the second weight=0.6*0.3=0.18. The first playback coefficient, the second playback coefficient and the third playback coefficient are calculated with the third weight respectively, so as to obtain third coefficients of multiple pieces of candidate preset information. The third coefficient of the fifth candidate preset information=the first playback coefficient* the third weight=0.6*0.1=0.06. The third coefficient of the sixth candidate preset information=the second playback coefficient* the third weight=0.3*0.1=0.03. The third coefficient of the seventh candidate preset information=the third playback coefficient* the third weight=0.1*0.1=0.01. In this case, a recommendation coefficient of the fifth candidate preset information=the first coefficient of the fifth candidate preset information+the second coefficient of the fifth candidate preset information+the third coefficient of the fifth candidate preset information=3+0.24+0.06=3.3. A recommendation coefficient of the sixth candidate preset information=the first coefficient of the sixth candidate preset information+the second coefficient of the sixth candidate preset information+the third coefficient of the sixth candidate preset information=1+0.12+0.03=1.15. A recommendation coefficient of the seventh candidate preset information=the first coefficient of the seventh candidate preset information+the second coefficient of the seventh candidate preset information+the third coefficient of the seventh candidate preset information=0.6+0.18+0.01=0.79.

Step 207, determining target preset information from the plurality of pieces of candidate preset information according to the recommendation coefficient.

All recommendation coefficients are arranged, and a first one of the recommendation coefficients is selected as an initial recommendation coefficient. A current recommendation coefficient is selected in an order of arrangement, and the current recommendation coefficient is compared with the initial recommendation coefficient. In response to that the current recommendation coefficient is greater than the initial recommendation coefficient, the initial recommendation coefficient is updated, until all recommendation coefficients are traversed, to obtain a target recommendation coefficient. The target recommendation coefficient is a final updated initial recommendation coefficient. The target preset information is determined from the plurality of pieces of candidate preset information based on the target recommendation coefficient.

For example, the recommendation coefficients include four recommendation coefficients, and the four recommendation coefficients are arranged to obtain a first recommendation coefficient, a second recommendation coefficient, a third recommendation coefficient and a fourth recommendation coefficient. The first recommendation coefficient is selected as an initialization recommendation coefficient, and the second recommendation coefficient is selected as a current recommendation coefficient to compare with the initialization recommendation coefficient. In a case where the second recommendation coefficient is greater than the first recommendation coefficient, the initialization recommendation coefficient is updated to the second recommendation coefficient. In a case where the second recommendation coefficient is not greater than the first recommendation coefficient, the first recommendation coefficient is maintained as the initialization recommendation coefficient, and the third recommendation coefficient is compared with the initialization recommendation coefficient, and so on, until the four recommendation coefficients are traversed, and the initialization recommendation coefficient after traversing the four recommendation coefficients is determined as the target recommendation coefficient.

Step 208, adjusting a playback parameter of an audio device based on the target preset information and playing an audio.

The playback parameter of the audio device is adjusted based on the target preset information to obtain the target playback parameter, an audio to be played is selected from the audio device, and the audio is played based on the target playback parameter.

The method further includes: subsequent to adjusting the playback parameter of the audio device based on the target preset information and playing the audio, synchronizing the target preset information to a device to be synchronized, where the device to be synchronized is an audio device connected to the audio device via wireless or a protocol.

The target preset information may be synchronized to the device to be synchronized through a wireless connection manner such as Bluetooth, Wi-Fi, etc., or the target preset information may be synchronized to the device to be synchronized through a communication protocol.

The step of synchronizing the target preset information to the device to be synchronized through the communication protocol includes: receiving an update command, and creating a synchronization message based on the update command and the target preset information; where the synchronization message includes the target preset information and identification information; and posting the synchronization message to a predetermined message queue, to enable the device to be synchronized to synchronize the synchronization message.

The target preset information is synchronized among multiple devices through a Message Queuing Telemetry Transport (MQTT) communication protocol. The preset information is stored in a cloud database in JavaScript Object Notation (JSON) format. The audio device and the device to be synchronized subscribe to the same MQTT topic. In a case where the preset information is updated, an update command is received, a new MQTT message is created as a synchronization message based on the update command and the target preset information, where the synchronization message includes the target preset information and identification information, and the identification information includes device ID and timestamp. The synchronization message is posted to a predetermined MQTT topic, the device to be synchronized receives the synchronization message and update its local playback parameter based on the content of the synchronization message, thereby achieving synchronization of the target preset information among multiple devices. Based on a Hypertext Transfer Protocol (HTTP) communication model and through RESTful Application Programming Interface (API), a playback control command is transmitted, and such a protocol as Digital Living Network Alliance (DLNA) or AirPlay is used for audio stream transmission.

In the present application, the preset information is stored in JSON format, thereby providing excellent readability, extensibility, and cross-platform compatibility. The preset information is synchronized among multiple devices through the MQTT protocol, while device discovery and connection are implemented using such a protocol as Multicast Domain Name System (mDNS) and Universal Plug and Play (uPnP). In addition, in the present application, the RESTful API is used for playback control, following the standard HTTP communication model, which offers advantages such as simple interfaces and ease of integration. For audio stream transmission, in the present application, established protocols like DLNA and AirPlay are utilized, thereby ensuring low latency and high quality in audio playback across multiple devices.

The audio device further includes a smart button, and the method further includes: subsequent to adjusting the playback parameter of the audio device based on the target preset information and playing the audio, receiving a target command of the user to trigger the smart button, and executing a corresponding preset function based on the target command, where the preset function includes: one-button audio playback, one-button switching of audio input sources, one-button switching of audio playback modes, one-button adjustment of audio playback sound effects, and one-button bookmarking of audio content.

The step of executing the corresponding preset function based on the target command includes: analyzing the target command and extracting key information, creating a hash key based on the key information, and searching for the corresponding preset function in a predetermined hash index based on the hash key, and executing the preset function.

The key information includes a button number, a trigger manner and etc. The trigger manner may be double-click, long press, short press, etc.

The key information may be a single keyword or a plurality of keywords. When the key information is a single keyword, it serves as a hash value. When the key information is a plurality of keywords, a unique hash key may be generated through a hash function based on those keywords. A hash index is a set of key-value pairs, where key refers to the hash key and value refers to the preset function. Thus, after generating the hash key based on the key information, it is able to determine the corresponding preset function in the hash index according to the hash key.

Through the smart button, it is able to realize such functions as one-touch playback, one-touch switching of audio input sources, one-touch switching of playback modes, one-touch switching of equalizer modes, and one-touch audio bookmarking across multiple devices. The audio input sources include Bluetooth, Wi-Fi, and others. The playback modes include sequential play, shuffle play, etc. The equalizer modes include such sound effects as pop, classical, rock, etc. One-touch bookmarking allows audio to be instantly saved to the Favorites folder for quick access later.

Through setting the preset information, multi-device synchronization, and smart button functionality, a flexible, personalized, and multi-device coordinated audio playback method is provided. The user may personalize the preset information based on the scenario and trigger desired playback mode and sound effect with one touch using the smart button. Cross-device use becomes more convenient as well.

In the embodiments of the present application, relevant data of an environment where the user is currently in is obtained through a preset sensor, the relevant data is analyzed based on a preset model to obtain the target user scenario, audio usage information of the user is retrieved from a local storage of the audio device to obtain the user historical data, and a plurality of pieces of candidate preset information corresponding to the target user scenario is determined from a pre-set device configuration information table. The device configuration information table includes a plurality of preset states, each preset state includes preset information of different user scenarios. Based on the user historical data, a degree of scenario relevance, the quantity of playbacks, and the quantity of selected times of a corresponding preset state of each candidate preset information are calculated. A recommendation coefficient of each candidate preset information is calculated based on the degree of scenario relevance, the quantity of playbacks and the quantity of selected times. The target preset information is determined from the plurality of pieces of candidate preset information according to the recommendation coefficient. The playback parameter of the audio device is adjusted based on the target preset information, and the audio is played. Therefore, it is able to improve the adaptiveness and convenience of audio playback.

The user scenario-based audio playback method in the embodiments of the present application has been described above. Below, a description is provided for a user scenario-based audio playback apparatus in the embodiments of the present application. Please refer to FIG. 3, an embodiment of the user scenario-based audio playback apparatus includes:

an obtaining module 301, configured to obtain a target user scenario that a user is currently in and user historical data;

a selecting module 302, configured to determine a plurality of pieces of candidate preset information corresponding to the target user scenario from a preset device configuration information table, where the device configuration information table includes a plurality of preset states, each preset state includes preset information of a plurality of different user scenarios;

a count module 303, configured to calculate, based on the user historical data, a degree of scenario relevance, the quantity of playbacks and the quantity of selected times of a corresponding preset state of each candidate preset information;

a calculating module 304, configured to calculate a recommendation coefficient of each candidate preset information based on the degree of scenario relevance, the quantity of playbacks and the quantity of selected times;

a determining module 305, configured to determine target preset information from the plurality of pieces of candidate preset information according to the recommendation coefficient; and a processing module 306, configured to adjust a playback parameter of an audio device based on the target preset information and play an audio.

In the embodiments of the present application, the target user scenario where the user is currently in and the user historical data are obtained, a plurality of pieces of candidate preset information corresponding to the target user scenario is determined from a pre-set device configuration information table. The device configuration information table includes a plurality of preset states, each preset state includes preset information of different user scenarios. Based on the user historical data, a degree of scenario relevance, the quantity of playbacks, and the quantity of selected times of a corresponding preset state of each candidate preset information are calculated. A recommendation coefficient of each candidate preset information is calculated based on the degree of scenario relevance, the quantity of playbacks and the quantity of selected times. The target preset information is determined from the plurality of pieces of candidate preset information according to the recommendation coefficient. The playback parameter of the audio device is adjusted based on the target preset information, and the audio is played. Therefore, it is able to improve the adaptiveness and convenience of audio playback.

Figure 4:
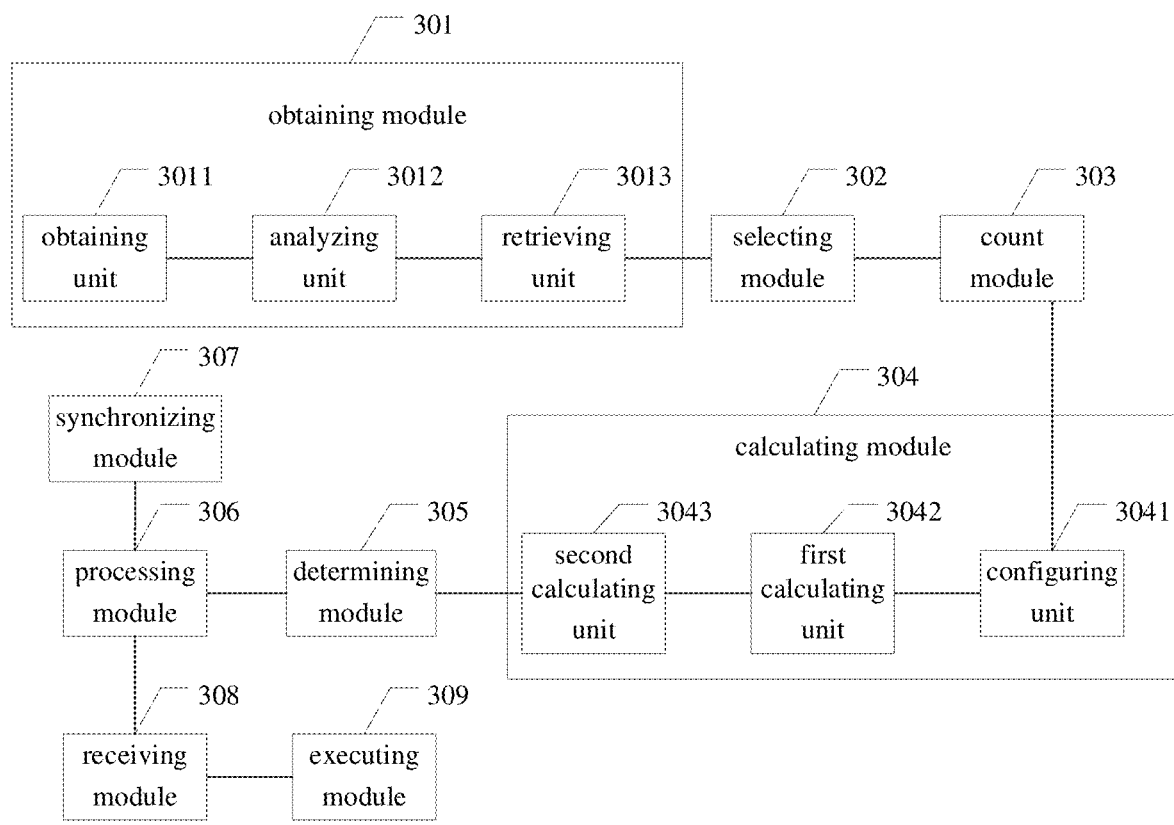
FIG. 4 is a schematic diagram of another embodiment of the user scenario-based audio playback apparatus according to the embodiment of the present application.

Please refer to FIG. 4, another embodiment of the user scenario-based audio playback apparatus includes:

an obtaining module 301, configured to obtain a target user scenario that a user is currently in and user historical data;

a selecting module 302, configured to determine a plurality of pieces of candidate preset information corresponding to the target user scenario from a preset device configuration information table, where the device configuration information table includes a plurality of preset states, each preset state includes preset information of a plurality of different user scenarios;

a count module 303, configured to calculate, based on the user historical data, a degree of scenario relevance, the quantity of playbacks and the quantity of selected times of a corresponding preset state of each candidate preset information;

a calculating module 304, configured to calculate a recommendation coefficient of each candidate preset information based on the degree of scenario relevance, the quantity of playbacks and the quantity of selected times;

a determining module 305, configured to determine target preset information from the plurality of pieces of candidate preset information according to the recommendation coefficient; and a processing module 306, configured to adjust a playback parameter of an audio device based on the target preset information and play an audio.

Optionally, the obtaining module 301 includes:

an obtaining unit 3011, configured to obtain relevant data of an environment where the user is currently in through a preset sensor;

an analyzing unit 3012, configured to analyze the relevant data based on a preset model to obtain the target user scenario; and a retrieving unit 3013, configured to retrieve audio usage information of the user from a local storage of the audio device to obtain the user historical data.

Optionally, the obtaining unit 3011 may be specifically configured to:

obtain brightness data of ambient light at a location where the user is currently in through a light sensor;

obtain acceleration data of the audio device at a current time through an accelerometer;

obtain geographical location information of the user at the current time through a locator; and obtain a sound wave signal at the location where the user is currently in through an audio detector.

Optionally, the analyzing unit 3012 may be specifically configured to:

perform feature extraction on the relevant data through a convolutional neural network to obtain feature information; and input the feature information into a scenario classification model and predict the target user scenario based on a classification rule of the scenario classification model.

Optionally, the count module 303 may be specifically configured to:

determine the quantity of playbacks of each candidate preset information from the user historical data;

determine the quantity of selected times of the preset state corresponding to each candidate preset information based on the user historical data, and calculate a total quantity of playbacks of all preset information within each preset state; and calculate the degree of scenario relevance of each candidate preset information based on the quantity of playbacks of each candidate preset information and the corresponding total quantity of playbacks.

Optionally, the calculating module 304 includes:

a configuring unit 3041, configured to configure corresponding weights to the degree of scenario relevance, the quantity of playbacks and the quantity of selected times;

a first calculating unit 3042, configured to calculate a first coefficient, a second coefficient and a third coefficient based on the quantity of selected times, the degree of scenario relevance and the quantity of playbacks with the respective weights; and a second calculating unit 3043, configured to calculate the recommendation coefficient of each candidate preset information based on the first coefficient, the second coefficient and the third coefficient.

Optionally, the first calculating unit 3042 may be specifically configured to:

normalize the quantity of playbacks to obtain a play coefficient;

multiply the first weight by the quantity of selected times to obtain the first coefficient;

multiply the second weight by the degree of scenario relevance to obtain the second coefficient; and multiply the third weight by the play coefficient to obtain the third coefficient.

Optionally, the determining module 305 may be specifically configured to:

arrange all recommendation coefficients, and select a first one of the recommendation coefficients as an initial recommendation coefficient;

select a current recommendation coefficient in an order of arrangement, and compare the current recommendation coefficient with the initial recommendation coefficient;

in response to that the current recommendation coefficient is greater than the initial recommendation coefficient, update the initial recommendation coefficient until all recommendation coefficients are traversed, to obtain a target recommendation coefficient; where the target recommendation coefficient is a final updated initial recommendation coefficient; and determine the target preset information from the plurality of pieces of candidate preset information based on the target recommendation coefficient.

Optionally, the user scenario-based audio playback apparatus further includes: a synchronizing module 307, configured to synchronize the target preset information to a device to be synchronized through a communication protocol.

Optionally, the synchronizing module 307 may be specifically configured to:

receive an update command, and create a synchronization message based on the update command and the target preset information; where the synchronization message includes the target preset information and identification information; and post the synchronization message to a predetermined message queue, to enable the device to be synchronized to synchronize the synchronization message.

Optionally, the user scenario-based audio playback apparatus further includes:

a receiving module 308, configured to receive a target command of the user to trigger the smart button; and an executing module 309, configured to execute a corresponding preset function based on the target command, where the preset function includes: one-button audio playback, one-button switching of audio input sources, one-button switching of audio playback modes, one-button adjustment of audio playback sound effects, and one-button bookmarking of audio content.

Optionally, the executing module 309 may be specifically configured to:

analyze the target command and extract key information;

create a hash key based on the key information; and search for the corresponding preset function in a predetermined hash index based on the hash key, and execute the preset function.

In the embodiments of the present application, relevant data of an environment where the user is currently in is obtained through a preset sensor, the relevant data is analyzed based on a preset model to obtain the target user scenario, audio usage information of the user is retrieved from a local storage of the audio device to obtain the user historical data, and a plurality of pieces of candidate preset information corresponding to the target user scenario is determined from a pre-set device configuration information table. The device configuration information table includes a plurality of preset states, each preset state includes preset information for different user scenarios. Based on the user historical data, a degree of scenario relevance, the quantity of playbacks, and the quantity of selected times of a corresponding preset state of each candidate preset information are calculated. A recommendation coefficient of each candidate preset information is calculated based on the degree of scenario relevance, the quantity of playbacks and the quantity of selected times. The target preset information is determined from the plurality of pieces of candidate preset information according to the recommendation coefficient. The playback parameter of the audio device is adjusted based on the target preset information, and the audio is played. Therefore, it is able to improve the adaptiveness and convenience of audio playback.

Figure 3:
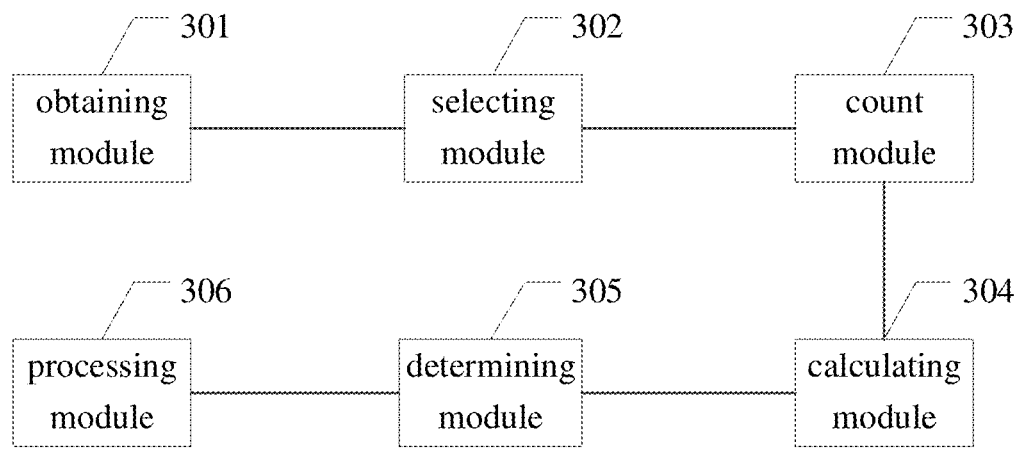
FIG. 3 is a schematic diagram of an embodiment of a user scenario-based audio playback apparatus according to the embodiments of the present application.

FIG. 3 and FIG. 4 provide a detailed description of the user scenario-based audio playback apparatus in the embodiments of the present application from the perspective of modular functional entities. Below, a detailed description of the user scenario-based audio playback apparatus is provided from the perspective of hardware processing.

Figure 5:
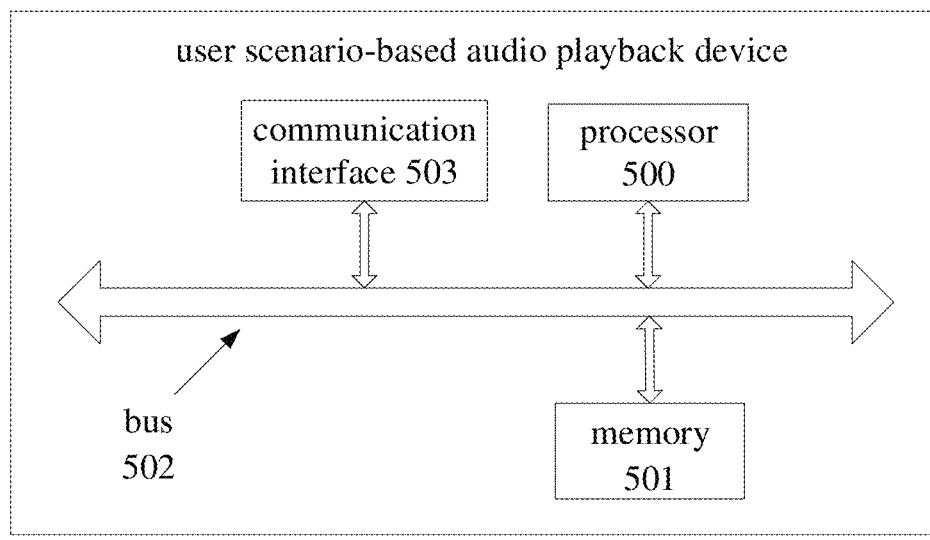
FIG. 5 is a schematic diagram of an embodiment of a user scenario-based audio playback device according to the embodiment of the present application.

As shown in FIG. 5, the user scenario-based audio playback device includes a processor 500 and a memory 501, the memory 501 has stored thereon machine executable instructions capable of being executed by the processor 500, the processor 500 is configured to execute the machine executable instructions to implement the above-mentioned user scenario-based audio playback method.

Furthermore, the user scenario-based audio playback device in FIG. 5 further includes a bus 502 and a communication interface 503. The processor 500, the communication interface 503, and the memory 501 are connected through the bus 502.

The memory 501 may include a high-speed random access memory (RAM) or a non-volatile memory, such as at least one disk memory. A communication connection between the system network element and at least one another network element is achieved through at least one communication interface 503 (which may be wired or wireless) and may use the Internet, a Wide Area Network (WAN), a Local Area Network (LAN), a Metropolitan Area Network (MAN), etc. The bus 502 may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, and etc. For convenience of representation, only one bidirectional arrow is used in FIG. 5 to indicate the bus, but it does not mean that there is only one bus or one type of bus.

The processor 500 may be an integrated circuit chip with signal processing capabilities. In the implementation process, each step of the aforementioned method may be accomplished through integrated logic circuits in hardware within the processor 500 or in the form of software instructions. The processor 500 may be a general-purpose processor, including a Central Processing Unit (CPU), Network Processor (NP), etc. It may also be a Digital Signal Processor (DSP), an Application Specific Integrated Circuit (ASIC), a Field-Programmable Gate Array (FPGA), or any other programmable logic device, a discrete gate or a transistor logic device, a discrete hardware component. The methods, steps, and logic diagrams of the embodiments in the present disclosure may be implemented or executed. The general-purpose processor may be a microprocessor or any general processor. The steps of the method in the embodiments may be directly executed by a hardware decoding processor or by a combination of hardware and software modules in a decoding processor. The software modules may be in a well-established storage medium in the art such as a random-access memory (RAM), a flash memory, a read-only memory (ROM), a programmable read-only memory (PROM), an electrically erasable programmable read-only memory (EEPROM), or a register. The storage medium is located in the memory 501, and the processor 500 reads information from the memory 501 and to perform the steps of the methods in the aforementioned embodiments in combination with the hardware of the processor 500.

The present application further provides a user scenario-based audio playback device, including: a memory and a processor, where the memory has stored thereon computer-readable instructions, and the computer-readable instructions, when executed by the processor, cause the processor to implement the steps of the user scenario-based audio playback method in the above embodiments.

The present application further provides a computer-readable storage medium, which may be a non-volatile computer-readable storage medium or a volatile computer-readable storage medium. The computer-readable storage medium has stored thereon instructions, and the instructions, when executed on a computer, cause the computer to implement the steps of the user scenario-based audio playback method.

Those skilled in the art may clearly understand that, for the sake of convenience and brevity of description, the specific working process of the aforementioned systems, apparatus and units can refer to the corresponding processes in the method embodiments, which are not repeated herein.

If the integrated unit is implemented in the form of software functional units and sold or used as an independent product, it may be stored in a computer readable storage medium. Based on this understanding, essence of the technical solutions of the present application, or the part contributing to the prior art, or all or part of the technical solutions, may be embodied in the form of a software product. The computer software product is stored in a storage medium, and includes a number of instructions to enable a computer device (which may be a personal computer, a server, or a network device, etc.) to perform all or part of the steps of method described in the various embodiments of the present application. The storage medium includes a USB flash disk, a mobile hard disk, a read-only memory (Read-Only Memory, ROM), a random access memory (Random Access Memory, RAM), a magnetic disk, an optical disk, or other medium which can store program code.

The above embodiments are only used to illustrate the technical solutions of the present application, but shall not be construed as limiting the present application. As can be appreciated by a person skilled in the art, although the present disclosure has been described in detail with reference to the foregoing embodiments, any modifications or variations of the technical solutions in the aforementioned embodiments, or equivalent replacements of part of the technical features within the scope of the disclosed technology, may still be made by those skilled in the art. These modifications or replacements do not make the essence of the corresponding technical solutions depart from the spirit and scope of the technical solutions of the embodiments of the present application.

What is claimed is:

1. A user scenario-based audio playback method, comprising:

obtaining a target user scenario that a user is currently in and user historical data;

determining a plurality of pieces of candidate preset information corresponding to the target user scenario from a preset device configuration information table, wherein the device configuration information table comprises a plurality of preset states, each preset state comprises preset information of a plurality of different user scenarios; each preset state comprises a home state, an outdoor state or a work state; the user scenarios comprise a rest scenario, an exercise scenario, a chatting scenario or a noisy scenario; each preset state comprises all the user scenarios, and each scenario corresponds to one piece of preset information; wherein the plurality of pieces of candidate preset information is determined from pieces of preset information in the preset device configuration information table;

calculating, based on the user historical data, a degree of scenario relevance, a quantity of playbacks and a quantity of selected times of a corresponding preset state of each candidate preset information;

calculating a recommendation coefficient of each candidate preset information based on a weighted sum of the degree of scenario relevance, the quantity of playbacks and the quantity of selected times;

determining target preset information from the plurality of pieces of candidate preset information according to the recommendation coefficient; and adjusting a playback parameter of an audio device based on the target preset information and playing an audio;

wherein calculating based on the user historical data the degree of scenario relevance, the quantity of playbacks and the quantity of selected times of the corresponding preset state of each candidate preset information comprises:

determining the quantity of playbacks of each candidate preset information from the user historical data; wherein the user historical data comprises quantities of playbacks of the pieces of preset information, and a quantity of playbacks of each preset information is determined in following manner: selecting a preset scenario within the preset state for playback; in response to selecting the preset scenario within the preset state for playback, determining the quantity of playbacks of each preset information by the quantity of times the audio is played;

determining the quantity of selected times of the preset state corresponding to each candidate preset information based on the user historical data, and calculating a total quantity of playbacks of all preset information within each preset state; wherein the user historical data comprises quantities of selected times of the pieces of preset information, and a quantity of selected times of each preset information is determined in following manner: selecting the preset scenario within the preset state for playback; in response to selecting the preset scenario within the preset state for playback, adjusting the playback parameter of the audio device based on each preset information corresponding to the preset scenario, playing the audio, and recording an increment of 1 in the quantity of selected times of the preset state; and calculating the degree of scenario relevance of each candidate preset information based on a ratio of the quantity of playbacks of each candidate preset information to the corresponding total quantity of playbacks.

2. The user scenario-based audio playback method according to claim 1, wherein obtaining the target user scenario that the user is currently in and user historical data comprises:

obtaining relevant data of an environment where the user is currently in through a preset sensor;

analyzing the relevant data based on a preset model to obtain the target user scenario; and retrieving audio usage information of the user from a local storage of the audio device to obtain the user historical data.

3. The user scenario-based audio playback method according to claim 2, wherein obtaining relevant data of the environment where the user is currently in through the preset sensor comprises:

obtaining brightness data of ambient light at a location where the user is currently in through a light sensor;

obtaining acceleration data of the audio device at a current time through an accelerometer;

obtaining geographical location information of the user at the current time through a locator; and obtaining a sound wave signal at the location where the user is currently in through an audio detector.

4. The user scenario-based audio playback method according to claim 3, wherein analyzing the relevant data based on the preset model to obtain the target user scenario comprises:

performing feature extraction on the relevant data through a convolutional neural network to obtain feature information; and inputting the feature information into a scenario classification model and predicting the target user scenario based on a classification rule of the scenario classification model.

5. The user scenario-based audio playback method according to claim 1, wherein calculating the recommendation coefficient of each candidate preset information based on the weighted sum of the degree of scenario relevance, the quantity of playbacks and the quantity of selected times comprises:

configuring corresponding weights to the degree of scenario relevance, the quantity of playbacks and the quantity of selected times;

calculating a first coefficient, a second coefficient and a third coefficient based on the quantity of selected times, the degree of scenario relevance and the quantity of playbacks with the respective weights; and calculating the recommendation coefficient of each candidate preset information based on the first coefficient, the second coefficient and the third coefficient.

6. The user scenario-based audio playback method according to claim 5, wherein in a case where the quantity of selected times corresponds to a first weight, the degree of scenario relevance corresponds to a second weight, and the quantity of playbacks corresponds to a third weight, calculating the first coefficient, the second coefficient and the third coefficient based on the quantity of selected times, the degree of scenario relevance and the quantity of playbacks with the respective weights comprises:

normalizing the quantity of playbacks to obtain a play coefficient;

multiplying the first weight by the quantity of selected times to obtain the first coefficient;

multiplying the second weight by the degree of scenario relevance to obtain the second coefficient; and multiplying the third weight by the play coefficient to obtain the third coefficient.

7. The user scenario-based audio playback method according to claim 5, wherein determining the target preset information from the plurality of pieces of candidate preset information according to the recommendation coefficient further comprises:
   arranging all recommendation coefficients, and selecting a first one of the recommendation coefficients as an initial recommendation coefficient;
   selecting a current recommendation coefficient in an order of arrangement, and comparing the current recommendation coefficient with the initial recommendation coefficient; in response to the current recommendation coefficient being greater than the initial recommendation coefficient, updating the initial recommendation coefficient until all recommendation coefficients are traversed, to obtain a target recommendation coefficient; wherein the target recommendation coefficient is a final updated initial recommendation coefficient; and
   determining the target preset information from the plurality of pieces of candidate preset information based on the target recommendation coefficient.

8. The user scenario-based audio playback method according to claim 1, subsequent to adjusting the playback parameter of the audio device based on the target preset information and playing the audio, further comprising:
   synchronizing the target preset information to a device to be synchronized through a communication protocol.

9. The user scenario-based audio playback method according to claim 8, wherein synchronizing the target preset information to the device to be synchronized through the communication protocol comprises:
   receiving an update command, and creating a synchronization message based on the update command and the target preset information; wherein the synchronization message comprises the target preset information and identification information; and
   posting the synchronization message to a predetermined message queue, to enable the device to be synchronized to synchronize the synchronization message.

10. The user scenario-based audio playback method according to claim 1, wherein the audio device comprises a smart button, and subsequent to adjusting the playback parameter of the audio device based on the target preset information and playing the audio, the method further comprises:
    receiving a target command of the user to trigger the smart button; and
    executing a corresponding preset function based on the target command, wherein the preset function comprises: one-button audio playback, one-button switching of audio input sources, one-button switching of audio playback modes, one-button adjustment of audio playback sound effects, and one-button bookmarking of audio content.

11. The user scenario-based audio playback method according to claim 10, wherein executing the corresponding preset function based on the target command comprises:
    analyzing the target command and extracting key information;
    creating a hash key based on the key information; and
    searching for the corresponding preset function in a predetermined hash index based on the hash key, and executing the preset function.

12. A user scenario-based audio playback device, comprising: a memory and at least one processor, wherein the memory has stored thereon instructions, and the at least one processor calls the instructions in the memory to cause the user scenario-based audio playback device to implement the user scenario-based audio playback method according to claim 1.

13. A non-transitory computer-readable storage medium having stored thereon instructions, wherein the instructions are executed by a processor to implement the user scenario-based audio playback method according to claim 1.

14. A user scenario-based audio playback apparatus, comprising:
    an obtaining module, configured to obtain a target user scenario that a user is currently in and user historical data;
    a selecting module, configured to determine a plurality of pieces of candidate preset information corresponding to the target user scenario from a preset device configuration information table, wherein the device configuration information table comprises a plurality of preset states, each preset state comprises preset information of a plurality of different user scenarios; each preset state comprises a home state, an outdoor state or a work state; the user scenarios comprise a rest scenario, an exercise scenario, a chatting scenario or a noisy scenario; each preset state comprises all the user scenarios, and each scenario corresponds to one piece of preset information; wherein the plurality of pieces of candidate preset information is determined from pieces of preset information in the preset device configuration information table;
    a count module, configured to calculate, based on the user historical data, a degree of scenario relevance, the quantity of playbacks and the quantity of selected times of a corresponding preset state of each candidate preset information;
    a calculating module, configured to calculate a recommendation coefficient of each candidate preset information based on a weighted sum of the degree of scenario relevance, the quantity of playbacks and the quantity of selected times;
    a determining module, configured to determine target preset information from the plurality of pieces of candidate preset information according to the recommendation coefficient; and
    a processing module, configured to adjust a playback parameter of an audio device based on the target preset information and play an audio;
    wherein the count module is specifically configured to:
    determine the quantity of playbacks of each candidate preset information from the user historical data; wherein the user historical data comprises quantities of playbacks of the pieces of preset information, and a quantity of playbacks of each preset information is determined in following manner: selecting a preset scenario within the preset state for playback; in response to selecting the preset scenario within the preset state for playback, determining the quantity of playbacks of each preset information by the quantity of times the audio is played;
    determine the quantity of selected times of the preset state corresponding to each candidate preset information based on the user historical data, and calculate a total quantity of playbacks of all preset information within each preset state; wherein the user historical data comprises quantities of selected times of the pieces of preset information, and a quantity of selected times of each preset information is determined in following manner: selecting the preset scenario within the preset state for playback; in response to selecting the preset scenario within the preset state for playback, adjusting the playback parameter of the audio device based on each preset information corresponding to the preset scenario, playing the audio, and recording an increment of 1 in the quantity of selected times of the preset state; and calculate the degree of scenario relevance of each candidate preset information based on a ratio of the quantity of playbacks of each candidate preset information to the corresponding total quantity of playbacks.

* * * * *